United States Patent
Jones

(10) Patent No.: US 7,925,204 B2
(45) Date of Patent: Apr. 12, 2011

(54) CELLULAR HANDSET WITH VIDEO GAME CONTROLLER

(75) Inventor: Bryce A. Jones, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 610 days.

(21) Appl. No.: 12/043,214

(22) Filed: Mar. 6, 2008

(65) Prior Publication Data

US 2009/0227284 A1    Sep. 10, 2009

(51) Int. Cl.
*H04H 40/00* (2008.01)
(52) U.S. Cl. .................... 455/3.06; 455/550.1
(58) Field of Classification Search ............. 455/3.06, 455/41.2, 66.1; 463/37, 7; 715/756
See application file for complete search history.

(56) References Cited

U.S. PATENT DOCUMENTS

| | | |
|---|---|---|
| 2005/0188821 A1 | 9/2005 | Yamashita et al. |
| 2006/0160623 A1 | 7/2006 | Lee |
| 2007/0142077 A1 | 6/2007 | Huang |
| 2007/0173319 A1 | 7/2007 | Kim et al. |
| 2008/0299906 A1* | 12/2008 | Li ........................ 455/41.2 |

* cited by examiner

*Primary Examiner* — Tu X Nguyen

(57) ABSTRACT

A cellular handset and video game manipulator has first and second beam generators projecting first and second beams from a selected surface of the handset. First and second detectors proximate the selected surface detect first and second manual interactions of a user with the beams. Command logic coupled to the first and second detectors interprets a first manual interaction preceding a second manual interaction as a downstroke command and interprets a second manual interaction preceding a first manual interaction as an upstroke command. The command logic is adapted to be coupled to a game controller to transmit the downstroke and upstroke commands as input to a video game, such as a guitar simulation. The player enjoys natural strumming and fretting techniques without reducing the utility of the phone for use as a cellular telephone. Network connectivity is provided to enable use in multi-player games employing a game server which further connects to a large display or monitor associated with a conventional game platform.

23 Claims, 5 Drawing Sheets

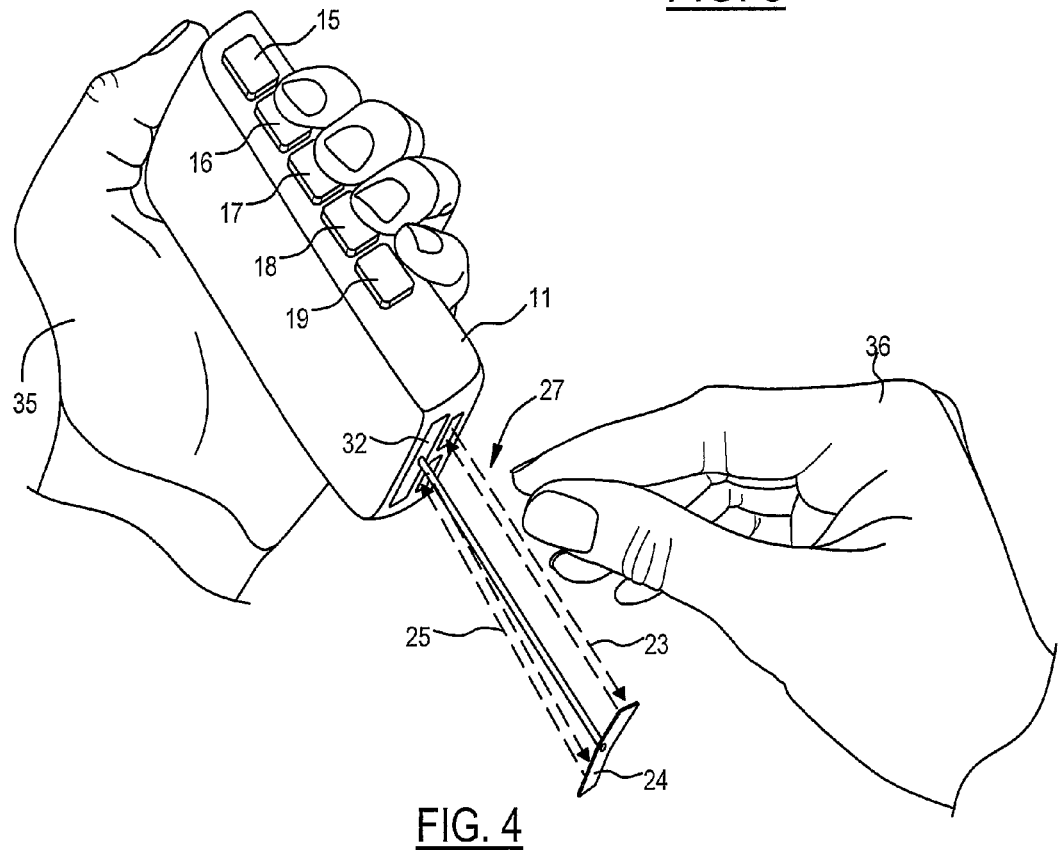
FIG. 3
FIG. 4
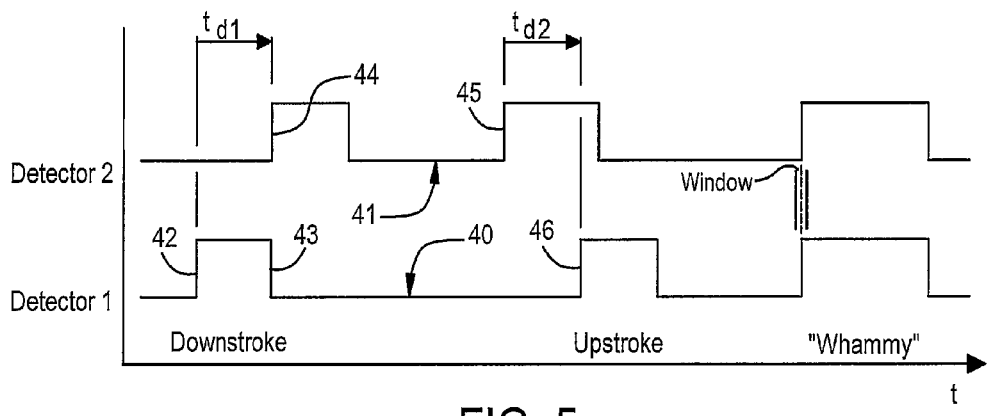
FIG. 5

CELLULAR HANDSET WITH VIDEO GAME CONTROLLER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a handset for cellular wireless telephones, and, more specifically, to a handset adapted to provide features for acting as an input manipulator for video games that can be played on the display of the handset or over the wireless network.

Guitar simulation video games such as Guitar Hero (published by RedOctane, Inc.) have become popular for game play that includes solo, cooperative, and competitive modes. Games of this type have been introduced for many different game consoles, as well as versions for personal computers and mobile cell phones. Standard game controllers have been used, such as game pads or joysticks, but many players prefer the use of mock guitar controllers specially made for the game platforms having various push buttons corresponding to guitar frets and other manipulators for controlling strumming action and tremolo or vibrato (i.e., a whammy bar). While such guitar controllers are portable in the sense that they can be taken to a friend's house of other gathering place having a game console or platform, they are too large to be conveniently carried in a pocket or purse, for example. Thus, an impromptu formation of a group of people for playing a game (i.e., a spontaneous jam session) is less likely to occur since a user desiring to play may not have a desired controller available.

Known versions of guitar simulations playable on a mobile cellular phone have not supported multi-players and have been limited to user input based on selected push buttons (i.e., keys) on the cellular phone. Furthermore, the phone display has been used as the game display so that natural and easy interaction with the game is reduced. Since no remote connectivity or network play has been supported, the normal performance expected by users of the console games has been lacking.

SUMMARY OF THE INVENTION

The present invention provides a mobile phone handset incorporating a guitar-type game manipulator that allows the player to use natural strumming and fretting techniques without reducing the utility of the phone for use as a cellular telephone. It provides a game manipulator with network connectivity for use in multi-player games employing a game server which further connects to a large display or monitor associated with a conventional game platform.

In one aspect of the invention, a cellular handset is provided for manipulating a video game. A first beam generator projects a first beam from a selected surface of the handset, and a second beam generator projects a second beam from the selected surface. A first detector proximate the selected surface detects a first manual interaction of a user with the first beam, and a second detector proximate the selected surface detects a second manual interaction of a user with the second beam. Command logic coupled to the first and second detectors interprets a first manual interaction preceding a second manual interaction as a downstroke command and interprets a second manual interaction preceding a first manual interaction as an upstroke command. The command logic is adapted to be coupled to a game controller to transmit the downstroke and upstroke commands as input to the video game.

BRIEF DESCRIPTION OF THE DRAWINGS

FIG. 3 is a side view of the handset of FIG. 1.

FIG. 4 is a perspective view of the handset being used to control a guitar simulation game.

FIG. 5 is a signal timing diagram for interpreting manual commands via the beam detectors.

DETAILED DESCRIPTION OF PREFERRED EMBODIMENTS

Figure 1:
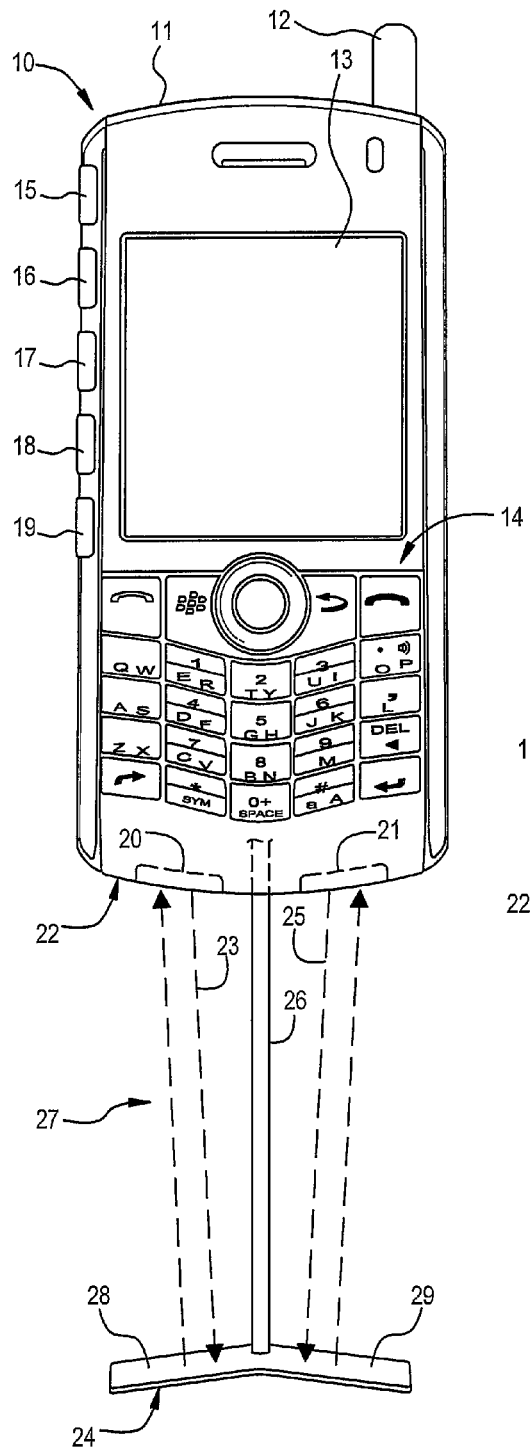
FIG. 1 is a front, plan view of a handset of the invention having a tailpiece in an extended position.

Referring to FIG. 1, a cellular handset of the present invention includes a main body 11 having an antenna housing 12, a graphics display 13, and a conventional keypad 14. Handset 10 performs all the normal functions of a cellular phone including communication of voice and/or data signals in a wireless cellular system.

Handset 10 includes additional elements providing it with the capability to act as an ergonomically realistic video game controller for video games utilizing particular combinations of manual movements such as guitar-based games to simulate the playing of a guitar (e.g., pressing fret buttons or making strumming movements according to a particular timing sequence as shown in a game display). Thus, a plurality of fret push buttons 15-19 is provided in a substantially straight row along one narrow side of main body 11. To provide a natural strumming method, a pair of infrared transceivers 20 and 21 (each including a respective infrared transmitter or beam generator and a infrared detector) is disposed on a selected surface 22 of main body 11. Preferably, surface 22 is the bottom edge of main body 11 as shown. Infrared transceiver 20 generates a first infrared beam 23 projected toward a reflector 24. Reflector 24 is held at a spaced position from surface 22 in alignment with beam 23 in order to reflect it to the detector in transceiver 20. Likewise, transceiver 21 generates a second infrared beam 25 projected to receiver 24 for reflection back to the detector in transceiver 21 by reflector 24. An extension rod 26 deploys from a retention slot in main body 11 to slidably extend outward from surface 22. Rod 26 has reflector 24 mounted at its distal end to create a strumming area 27 between surface 22 and reflector 24. A preferred embodiment detects strumming as interruptions in beams 23 and 25. With properly selected beam characteristics, however, it is also possible to dispense with a reflector and instead detect the reflection of a beam by the hand or other object controlled by the user. In that alternative embodiment, a return of the beam would not normally be detected except when the user makes a control action to move the hand into the beam where it can reflect some of the beam to the detector. In either embodiment, the user moves their fingers or other objects (such as a guitar pick) in strumming area 27 to create a first manual interaction with the first beam which is detected by the first detector, and a second manual interaction with the second beam which is detected by the second detector.

As described below, two infrared beams are used in order to enable detection of a strumming direction. Thus, when the first manual interaction precedes the second manual interaction, a downstroke strumming command is generated. When the second manual interaction precedes the first manual interaction, it is interpreted as an upstroke strumming command. Beams 23 and 25 may preferably be substantially parallel when leaving transceivers 20 and 21. In order to minimize interference or crosstalk between the beams, reflector 24 preferably has a non-planar shape causing the reflected beams to slightly diverge. Thus, reflector 24 is shown having a first wing 28 and a second wing 29 wherein the ends of wings 28 and 29 are slightly further from surface 22 than at their central attachment point to extension rod 26. In other words, reflector 24 is optically convex to diverge the reflected beams.

Infrared transceivers 20 and 21 may comprise commonly available, low cost devices such as those already used in personal digital assistance (PDA) cellular handsets for performing infrared data transmission (e.g., as an IrDA port). The transceivers typically include an infrared light emitting diode (LED) and an infrared photodetector covered by an infrared-transmitting plastic lens. Alternatively, discrete LED's and photodetectors may be employed. Furthermore, other non-infrared light sources and detectors or other proximity sensing technologies such as ultrasonics can be employed in the present invention.

Figure 2:
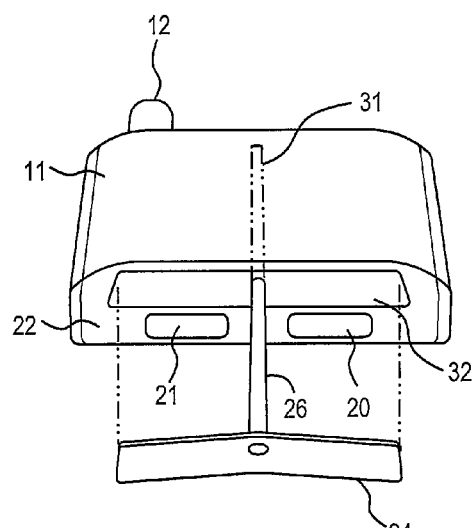
FIG. 2 is a rear, perspective view of the handset of FIG. 1.
Figure 6:
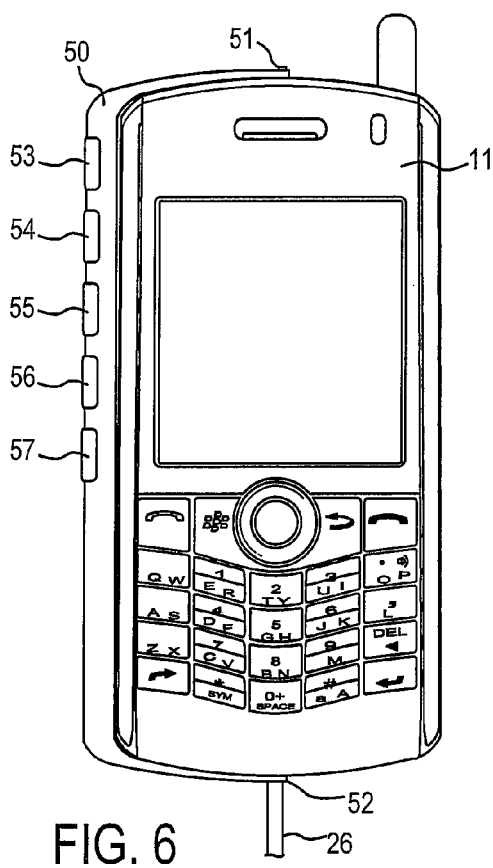
FIGS. 6-9 show an alternative embodiment of the handset for providing repositionable fret buttons for either right-handed or left-handed use.

As shown in FIG. 2, main body 11 has a recess 31 for receiving extension rod 26 allowing it to retract so that reflector 24 is stowed in a recess 32 within surface 22. Preferably, a locking mechanism (not shown) is employed within main body 11 for firmly locking extension rod 26 and reflector 24 in either a retracted or an extended position. For example, a locking system may be activated by rotating reflector 24 by 180° after it is slid to its extended position. Detents or catch mechanisms can alternatively be used to generate the locks. Since extension rod 26 is substantially straight and reflector 24 is elongated in a direction parallel with the side-to-side direction of surface 22, recess 32 must also extend in the side-to-side direction, but it is offset (i.e., adjacent to) the location of transceivers 20 and 21.

Because of a possible offset between the orientation of the transceivers and the positioning of the reflector by the straight rod, the reflector elements on each wing are provided with a particular shape to create a predetermined rotation of beams 23 and 25 towards the infrared transceivers. For example, the flat, reflecting surfaces of the reflector wings are sloped at an angle with respect to elongated rod 26 as shown in FIG. 3. Thus, the predetermined rotation of the infrared beams is perpendicular to the side-to-side dimension of surface 22. As a result, the infrared beams are more directly reflected back to the transceivers and the necessary movements of the hand through strumming area 27 is raised away from extension rod 26 so that rod 26 does not interfere with the strumming action.

In addition to a downstroke and an upstroke command, the present invention can recognize a third command in response to the hand being held in such a way that it blocks both infrared beams simultaneously. The third command can correspond with the vibrato, tremolo, or a whammy bar function (i.e., pitch bending).

FIG. 4 shows a manner of use of the handset as a guitar controller. Main body 11 is grasped in a hand 35 so that the fingers can easily reach across the front of the handset to fret buttons 15-19. Reflector 24 is extended from recess 32 to create strumming area 27 within which infrared beams 23 and 25 normally circulate. A hand 36 is brought into strumming area 27 to sweep over beams 23 and 25 sequentially in a downward or upward movement. In addition, hand 36 can be placed to simultaneously interrupt beams 23 and 25 for a third command.

Detection of a strumming command is performed using the preferred method of FIG. 5. In one preferred embodiment, the infrared generators are always on so that infrared beams 23 and 25 are continuous, thereby providing a substantially continuous received signal at both detectors. Waveforms 40 and 41 represent a logic signal that is generated in response to the detector signals and having a first logic level when a respective beam is unblocked (i.e., being received) and a second logic level when a respective beam is blocked (i.e., not being received). In the example shown, waveforms 40 and 41 have a high logic level during detection of an interruption (i.e., a manual interaction) from the two detectors.

When a first manual interaction begins wherein the users hand begins to block the first beam, waveform 40 shows a rising leading edge 42 at the corresponding time. As the user's hand moves downward in the strumming area, eventually the first beam is unblocked resulting in a trailing edge 43 in waveform 40 where the interruption detection logic signal is restored to a low logic level. The user's hand continues to move downward and eventually blocks the second beam so that waveform 41 shows a rising leading edge 44. A delay time $t_{d1}$ between leading edges 42 and 44 is determined by a logic controller which is coupled to the infrared transceivers. If delay $t_{d1}$ matches a predetermined delay, then a downstroke strumming command is detected. The predetermined delay has a range of time values according to a maximum speed at which the strumming is to occur. Thus, inadvertent or incorrect blockage of the infrared beams is not interpreted as a strumming stroke. Delays within the predetermined range of times can also be detected and used to indicate different strumming speeds for use in controlling the video game, if desired. On the other hand, the minimum time delay within the range for detecting a strumming command is sufficiently long to accommodate a small error in the user's ability to block both beams simultaneously when intending to generate the third command.

An upstroke command is generated by moving the hand or fingers in an upward direction through the strumming area to generate first rising edge 45 in waveform 41 and then a second rising edge 46 in waveform 40, wherein a time delay $t_{d2}$ between rising edges 45 and 46 is within the predetermined delay range.

To provide further flexibility in generating fret commands using appropriate push buttons, the fret buttons may be mounted to a pivotally-attached swing arm having a button surface substantially perpendicular to surface 22 as shown in FIGS. 6-9. Thus, a swing arm 50 is attached to upper and lower ends of main body 11 at pivot points 51 and 52 such that swing arm 50 swings or rotates around main body 11 over a range of at least about 180° between a right-handed playing position shown in FIG. 6 and a left-hand playing position shown in FIG. 9. Detents or other holding mechanisms may preferably be associated with pivots 51 and/or 52 for maintaining swing arm 50 in its end positions shown in FIGS. 6 and 9.

Figure 7:
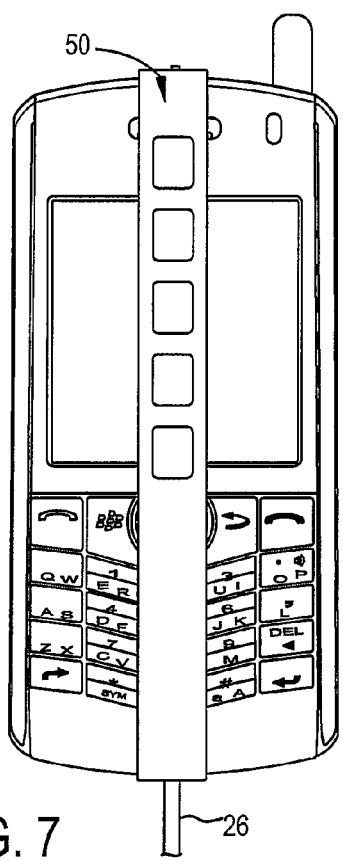
Figure 8:
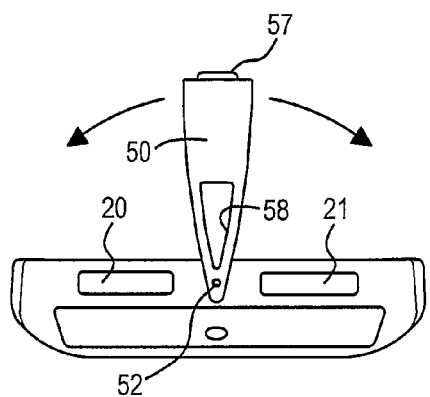
Figure 9:
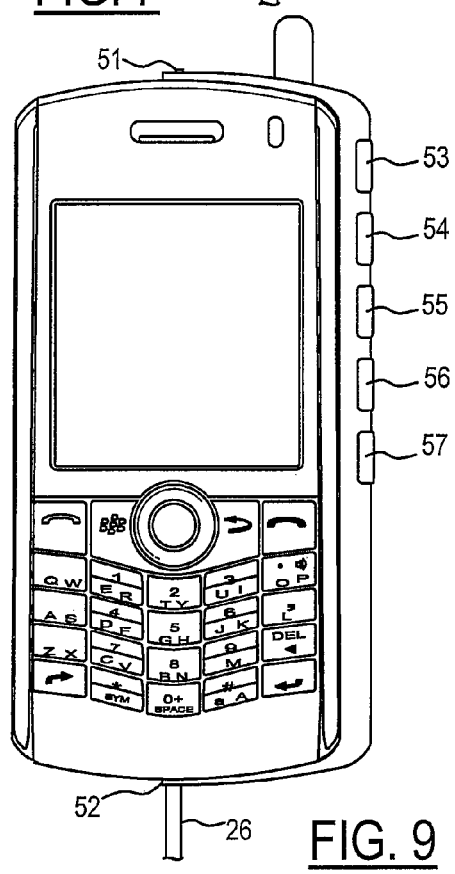

FIG. 7 shows swing arm 50 being rotated between opposite sides. It may be desirable to provide additional holding positions using detents at such an intermediate position to adapt use of the handset controls to a different type of video game, for example. FIG. 8 shows an end view with swing arm 50 in an intermediate position. An aperture 58 is provided through swing arm 50 to be aligned with infrared transceivers 20 and 21 when in its end positions so that swing arm 50 does not interfere with the infrared beams.

Figure 10:
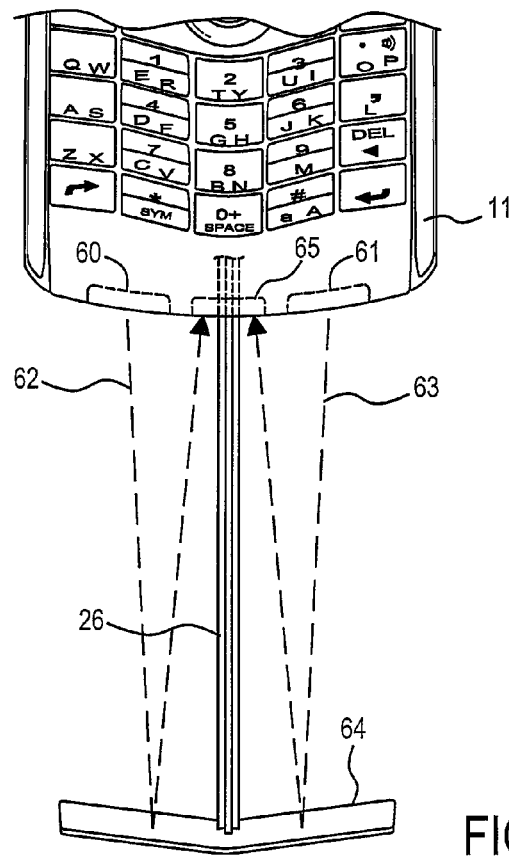
FIG. 10 shows an alternative embodiment using two beam generators and one beam detector.

FIG. 10 shows an alternative embodiment employing a pair of beam generators comprising infrared LED's 60 and 61 generating beams 62 and 63 which are projected toward a reflector 64. Due to a slightly concave shape of reflector 64, beams 62 and 63 are converged to a single detector 65. Instead of providing reflector 64 with a non-planar shape to converge the beams, an optically modified surface such as a series of saw tooth-shaped grooves can alternatively be used.

In order to separately detect interruption of beams 62 and 63 using a single detector 65, the beams are modulated in different ways in order to enable reception of each beam to be distinguishable. One modulation scheme is to alternately pulse each LED 60 and 61 to alternately produce a detectable signal at detector 65. Pulsing is required to occur at a period shorter than the time in which significant movement of the hand sweeping through the strumming area could move an appreciable distance compared to the width of the beams.

Alternatively, each beam can be modulated with an information content that is uniquely recoverable by detector 65 to detect at what times each beam is still being received. For example, each beam can be amplitude modulated or frequency modulated according to unique frequencies or information content that are non-overlapping. Various code transmission protocols could be used as are known in the art.

Figure 11:
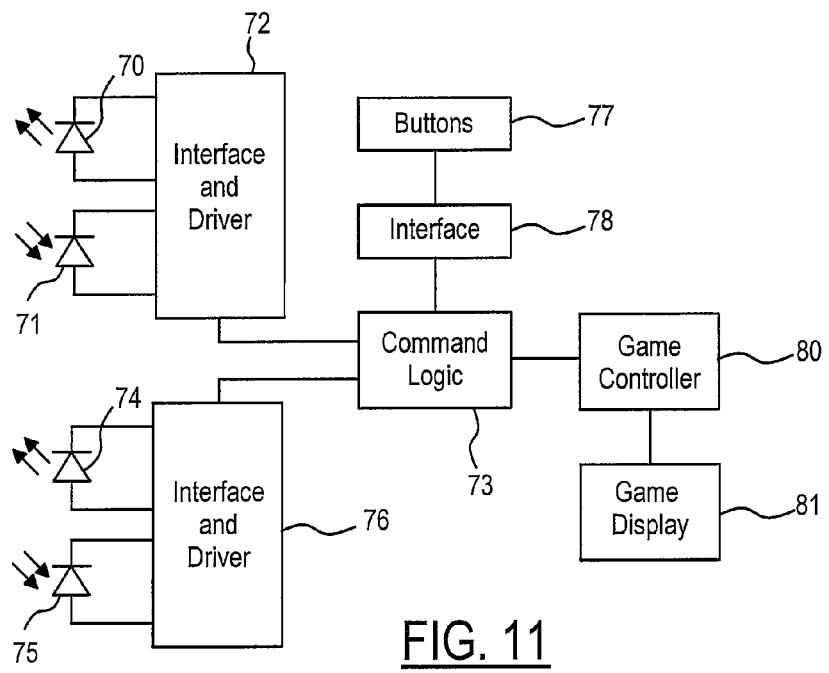
FIG. 11 is a block diagram showing the handset and video game elements in greater detail.

A hardware implementation of the present information is shown in greater detail in FIG. 11. A first LED 70 and a first photodetector 71 are coupled to an interface and driver circuit 72. Devices 70-72 may comprise a commercially available infrared transceiver, for example. Interface and driver circuit 72 operates under control of command logic 73. In one preferred embodiment, command logic 73 provides an activation signal to driver and interface circuit 72 when the handset is in a mode to detect strumming commands. Interface and driver circuit 72 automatically controls operation of LED 70 and photodetector 71 and provides an interruption signal to command logic 73 when its respective beam is being interrupted. When a single detector is being used, modulation of the beam and demodulation of the detected beam may preferably be performed by interface and driver circuit 72, but could alternative be handled by command logic block 73. A second LED 74 and photodetector 75 are connected to another interface and driver circuit 76 similarly connected to command logic 73. Fret buttons 77 are coupled to command logic 73 through an interface 78.

Command logic 73 compares interruption events detected for each respective beam to interpret the occurrence of upstroke and downstroke commands, as well as the third command representing the pitch bending function. Thus, if interruption events occur with rising edges within a predetermined shortest delay time, then a third command is generated. If interruption events occur according to a delay within the predetermined delay range, then an upstroke or downstroke command is generated. The generated commands are provided to a game controller 80 which is coupled to a game display 81. Game controller 80 implements the actual video game software such as the guitar simulation and may reside either on the handset itself or remotely on a game platform accessed by the handset over the cellular network.

Figure 12:
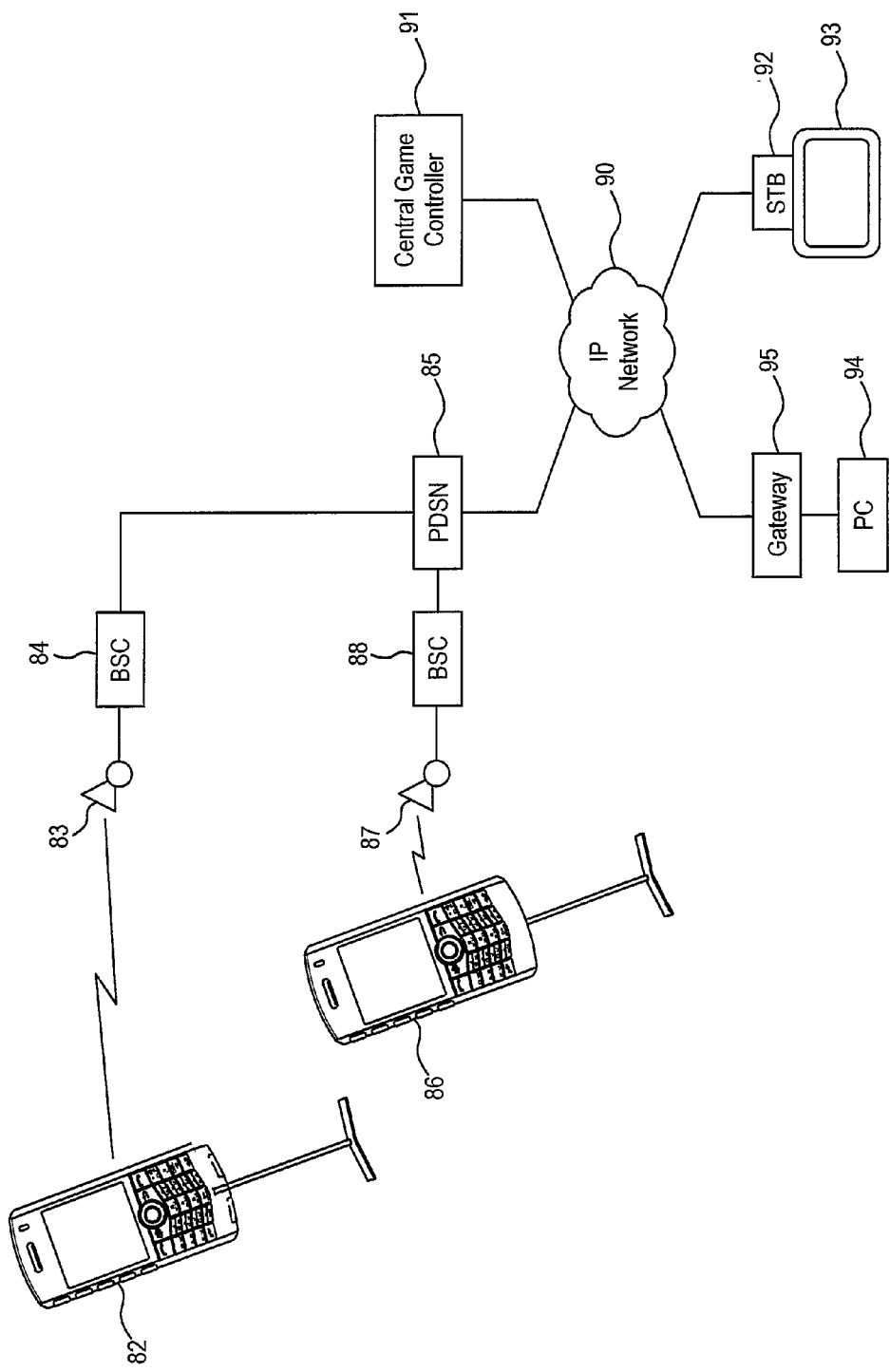
FIG. 12 is a block diagram showing a network system for supporting use of the handset in a multi-player gaming environment.

FIG. 12 shows a network system for supporting multi-player games accessible to a player using a handset 82 of the present invention. Handset 82 wirelessly connects to a base station 83 in turn coupled to a base station controller (BSC) 84. The wireless cellular system preferably supports digital data transmission to a packet data serving node (PDSN) 85 which is coupled to an IP network 90 (which may preferably be owned and operated by the wireless service provider). A central game controller 91 is coupled to IP network 90 and implements the video game in response to inputs from the player using handset 82. A second player using a handset 86 may be similarly coupled to a base station 87 and a BSC 88 in order to send digital data commands to PDSN 85 for forwarding to game controller 91 through IP network 90. Game controller 91 may be configured to provide video game output to a designated set top box (STB) 92 associated with a television display 93. Thus, the players using handsets 82 and 86 do not need to view the game using displays on their handsets but can playing the video game from the location of TV monitor 93 to view the game display. Additional players can be joined to a game from a PC or other game console 94 coupled by a gateway 95 to IP network 90. Alternatively, a PC or console 94 can be utilized by game controller 91 as the game display.

What is claimed is:

1. A cellular handset for manipulating a video game, comprising:
    a first beam generator projecting a first beam from a selected surface of the handset;
    a second beam generator projecting a second beam from the selected surface of the handset;
    a first detector proximate the selected surface for detecting a first manual interaction of a user with the first beam;
    a second detector proximate the selected surface for detecting a second manual interaction of a user with the second beam; and
    command logic coupled to the first and second detectors for interpreting a first manual interaction preceding a second manual interaction as a downstroke command and for interpreting a second manual interaction preceding a first manual interaction as an upstroke command, wherein the command logic is adapted to be coupled to a game controller to transmit the downstroke and upstroke commands as input to the video game.

2. The cellular handset of claim 1 wherein the command logic further interprets a simultaneous occurrence of the first and second manual interactions as a third command.

3. The cellular handset of claim 2 wherein the video game is a guitar simulation game, wherein the downstroke and upstroke commands correspond to strumming of a guitar, and wherein the third command corresponds to a pitch bending of the guitar.

4. The cellular handset of claim 1 further comprising:
    a reflector held at a spaced position from the selected surface in alignment with the first and second beams adapted to reflect them to the first and second detectors, respectively;
    wherein the first and second manual interactions each comprises a respective manual interruption of the reflections of the first and second beams to the first and second detectors, respectively.

5. The cellular handset of claim 4 further comprising an extension rod that slidably extends from the selected surface, wherein the reflector is mounted to a distal end of the extension rod.

6. The cellular handset of claim 5 wherein the extension rod is substantially straight, wherein the reflector is elongated in a direction parallel with a side-to-side direction of the selected surface of the handset, and wherein the reflector has first and second reflecting elements receiving the first and second beams, respectively, and shaped to provide a predetermined rotation of the first and second beams perpendicular to the parallel direction and toward the first and second detectors.

7. The cellular handset of claim 5 wherein the reflector is elongated in a direction parallel with a side-to-side direction of the selected surface of the handset, and wherein the reflector has first and second reflecting elements receiving the first and second beams, respectively, and shaped to provide a predetermined divergence of the reflected first and second beams so that the first beam is reflected in a direction away from the second detector and the second beam is reflected in another direction away from the first detector.

8. The cellular handset of claim 1 further comprising:
a plurality of push buttons disposed on a second surface substantially perpendicular to the selected surface coupled to the command logic, wherein a user actuates the push buttons to generate signals interpreted by the command logic as respective fret commands.

9. The cellular handset of claim 8 wherein the second surface is provided on a pivotally-attached swing arm capable of swinging over a range of about 180° around the cellular handset to adapt the push buttons to be actuated from either a right handed configuration or a left handed configuration.

10. The cellular handset of claim 1 wherein the first and second beam generators are comprised of infrared LED's and wherein the first and second detectors are comprised of infrared photodetectors.

11. A cellular handset for manipulating a video game, comprising:
a first beam generator projecting a first beam from a selected surface of the handset;
a second beam generator projecting a second beam from the selected surface of the handset;
a detector proximate the selected surface for detecting a first manual interaction of a user with the first beam and a second manual interaction of the user with the second beam; and
command logic coupled to the detector for interpreting a first manual interaction preceding a second manual interaction as a downstroke command and for interpreting a second manual interaction preceding a first manual interaction as an upstroke command, wherein the command logic is adapted to be coupled to a game controller to transmit the downstroke and upstroke commands as input to the video game.

12. The cellular handset of claim 11 wherein the command logic further interprets a simultaneous occurrence of the first and second manual interactions as a third command.

13. The cellular handset of claim 12 wherein the video game is a guitar simulation game, wherein the downstroke and upstroke commands correspond to strumming of a guitar, and wherein the third command corresponds to a pitch bending of the guitar.

14. The cellular handset of claim 11 further comprising:
a reflector held at a spaced position from the selected surface in alignment with the first and second beams adapted to reflect them to the detector;
wherein the first and second manual interactions each comprises a respective manual interruption of the reflections of the first and second beams to the detector.

15. The cellular handset of claim 14 further comprising an extension rod that slidably extends from the selected surface, wherein the reflector is mounted to a distal end of the extension rod.

16. The cellular handset of claim 14 further comprising:
first and second drivers for activating the first and second beam generators according to first and second beam modulations, respectively; and
a demodulator for sensing the first and second beam modulations and for detecting the first and second manual interactions in response to a respective beam modulation being absent.

17. The cellular handset of claim 11 further comprising:
a plurality of push buttons disposed on a second surface substantially perpendicular to the selected surface coupled to the command logic, wherein a user actuates the push buttons to generate signals interpreted by the command logic as respective fret commands.

18. The cellular handset of claim 17 wherein the second surface is provided on a pivotally-attached swing arm capable of swinging over a range of about 180° around the cellular handset to adapt the push buttons to be actuated from either a right handed configuration or a left handed configuration.

19. The cellular handset of claim 11 wherein the first and second beam generators are comprised of infrared LED's and wherein the detector is comprised of an infrared photodetector.

20. A method of controlling a video game using a cellular handset, comprising the steps of:
extending a reflector from a main body of the cellular handset;
directing first and second interruptible beams from the main body to the reflector;
detecting the return of the first and second beams to the main body;
detecting respective interruptions resulting from blocking the first and second beams;
generating a downstroke command when an interruption of the first beam precedes an interruption of the second beam by a predetermined delay;
generating an upstroke command when an interruption of the second beam precedes an interruption of the first beam by the predetermined delay; and
transmitting the downstroke and upstroke commands to a game controller as input to a video game.

21. The method of claim 20 wherein the predetermined delay is comprised of a range of time values between a minimum and a maximum.

22. The method of claim 20 further comprising the steps of:
generating a third command when a substantially simultaneous interruption of the first and second beam is detected; and
transmitting the third command to the game controller as input to the video game.

23. The method of claim 20 wherein the video game comprises a guitar simulation, wherein the upstroke and downstroke commands correspond to strumming, and wherein the method further comprises the step of:
generating fret commands in response to manual actuation of push buttons on the main body; and
transmitting the fret commands to the game controller as input to the video game.

* * * * *